United States Patent [19]

Stinson

[11] 4,192,387

[45] Mar. 11, 1980

[54] CYLINDRICAL DRUM TILLER ATTACHMENT

[76] Inventor: Theodore W. Stinson, 615 Fairdale Ave., Bowling Green, Ky. 42101

[21] Appl. No.: 849,358

[22] Filed: Nov. 7, 1977

[51] Int. Cl.² .................. A01B 45/02; A01B 33/02; B62D 51/04
[52] U.S. Cl. ........................ 172/21; 172/42; 172/119; 172/122; 172/554
[58] Field of Search .............. 172/21, 22, 42, 122, 172/554, 43, 119; 404/121, 128, 131

[56] References Cited

U.S. PATENT DOCUMENTS

| | | | |
|---|---|---|---|
| 220,210 | 9/1879 | Scivalley | 172/119 X |
| 468,382 | 2/1892 | Beck | 56/377 |
| 527,993 | 10/1894 | Jones | 172/122 X |
| 840,788 | 1/1907 | Meade | 172/554 |
| 1,038,240 | 9/1912 | Veitl | 172/119 X |
| 1,807,150 | 5/1931 | Caldwell | 172/119 X |
| 2,090,973 | 8/1937 | Basham | 172/121 |
| 2,171,098 | 8/1939 | Ragland, Sr. et al. | 404/121 |
| 2,314,035 | 3/1943 | Dontje | 172/42 |
| 2,353,345 | 7/1944 | Lindskog | 172/122 |
| 2,975,735 | 3/1961 | Purvance | 111/6 |
| 3,123,149 | 3/1964 | White | 172/42 |
| 3,148,737 | 9/1964 | Lunsford | 172/21 |
| 3,650,332 | 3/1972 | Dedoes | 172/22 |
| 3,794,121 | 2/1974 | Drozak | 172/21 |
| 3,867,052 | 2/1975 | Durham | 404/121 |
| 3,891,342 | 6/1975 | Roe | 404/128 |

FOREIGN PATENT DOCUMENTS

| | | | |
|---|---|---|---|
| 895004 | 4/1962 | Canada | 172/43 |
| 1440411 | 4/1966 | France | 172/122 |
| 1482370 | 4/1967 | France | 172/42 |
| 1070778 | 6/1967 | United Kingdom | 172/42 |

*Primary Examiner*—Richard T. Stouffer
*Attorney, Agent, or Firm*—Cushman, Darby & Cushman

[57] ABSTRACT

A drum attachment for conventional tillers that expands the possible uses for such tillers. A pair of drums may be detachably mounted to a tiller shaft in place of conventional tiller blades, each drum being attached to the shaft by one or more pins held by spring keeper keys passing through an interior sleeve of the drum and the shaft. Spider assemblies space the exterior surface of the drum from the sleeve while still allowing access to the pins from the exterior of the drum. On the surface of the drum a number of radially outwardly extending teeth are provided, the teeth being arranged in spiral courses and in circumferential rows. The teeth preferably are cylinders about one and one-half inch long and half-inch in diameter. The invention is useful for tilling, cultipacking, dethatching, seedbed preparation, and aeration.

6 Claims, 4 Drawing Figures

CYLINDRICAL DRUM TILLER ATTACHMENT

BACKGROUND AND SUMMARY OF THE INVENTION

Operator controlled tillers are in widespread use today. Such tillers include a horizontally disposed shaft that is rotated by a gasoline engine connected through a chain drive to the shaft, with wheels mounting the engine and a pair of handles extending from the engine on the opposite side of the engine as the shaft. A single operator may grab the handles and walk behind the tiller. Conventional tiller blades are worthwhile for cultivating the soil, however that is essentially the only normal useful function for such blades. It would be very desirable if a conventional tiller were adaptable so that it could perform a number of other earth-working and lawn-maintenance functions in addition to cultivating since maximum use could be obtained from a single power plant.

According to the present invention, an attachment is provided for a conventional tiller that may be readily detachably disposed on the tiller shaft so that it is interchangeable with conventional tiller blades, the drum attachment according to the invention greatly expanding the usefulness of the tiller for earth-working and lawn maintenance. The drum according to the present invention comprises a tubular shell defining a curved exterior surface, and a tubular sleeve disposed interiorly of and radially spaced from the tubular shell and concentric therewith, the sleeve adapted to be disposed over the conventional tiller power shaft and detachably mounted thereto. A plurality of teeth are disposed on the exterior surface and they project radially outward from the surface. The teeth are disposed in a plurality of spiral courses to insure that the tiller runs smoothly and does not bounce up and down, and additionally are disposed in circumferential rows, all teeth in each circumferential row being disposed in a plane perpendicular to the shaft. The teeth preferably are cylindrical, and may have a diameter of about one-half inch and a length of about one and one-half inches, the center of each tooth being spaced approximately two inches from the adjacent teeth in each spiral course. Pins with spring keepers are used to attach the sleeve to the shaft, and spider assemblies attach the tubular shell to the shaft so that ready access to the pins for the detachment thereof is provided.

A conventional tiller having a pair of drums according to the present invention mounted on the shaft thereof is useful for performing a large variety of functions in addition to tilling. For instance, a conventional tiller having the drum attachments according to the invention can cultipack when self-propelled, is an excellent dethatcher when used on lawns, pulverizes soil and prepares seedbeds for planting, can work seed and fertilizer into the soil once the seed and fertilizer are spread over the soil, and is useful as a soil aerator. For maximum efficiency of the cultipacking operation, it is necessary that the teeth be cylinders rather having sharpened ground engaging portions.

While it is of course intended that the drums according to the invention be readily detachably mountable on a tiller shaft, the invention also contemplates the provision of an earth-working assembly in general wherein at least one cyclinical drum is either fixedly or detachably attached to a generally horizontal disposed power shaft. The cylinder has a plurality of teeth with means for mounting the teeth so that they project radially outwardly from the curved exterior surface of the cylinder and are disposed in a plurality of spiral courses, and preferably in circumferential rows with all teeth in each circumferential row being disposed in a plane perpendicular to the shaft.

It is the primary object of the present invention to provide a flexible earth-working and lawn care assembly. This and other objects of the invention will become clear from an inspection of the detailed description of the invention, and from the appended claims.

DETAILED DESCRIPTION OF THE DRAWINGS

Figure 1:
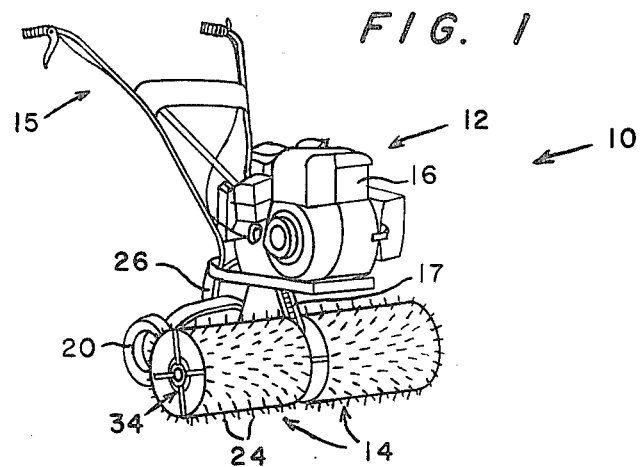
FIG. 1 is a perspective view of an earth-working assembly according to the present invention.

An earth-working assembly according to the present invention is shown generally at 10 in FIG. 1, the assembly 10 including a conventional single operator tiller 12 with cylindrical earth-working drums 14 attached to the power shaft thereof. The conventional tiller 12 is controlled by an operator walking behind the tiller holding onto the handle means 15, the tiller 12 including a power means such as a gasoline engine 16 attached by a chain drive 17 or the like to a shaft 18 that is mounted in a generally horizontal position by a center bushing 19 or the like, a pair of wheels 20 being mounted to the back of the tiller 12 for supporting the engine 16 and shaft 18 for movement along the ground.

Figure 2:
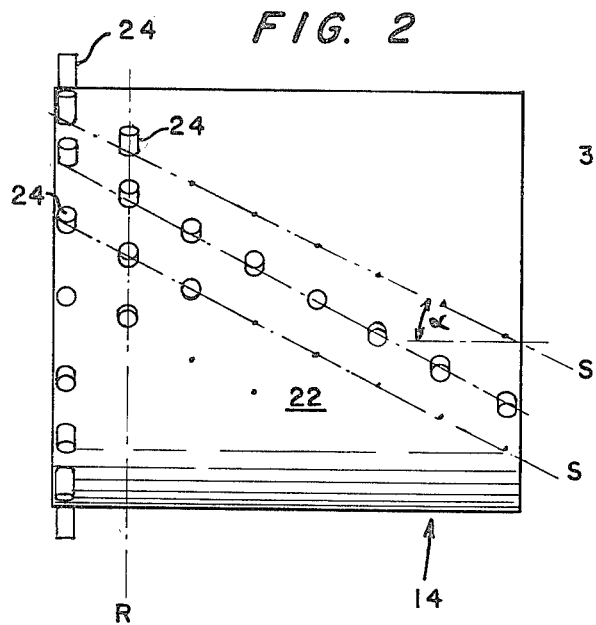
FIG. 2 is a front view of an exemplary drum according to the present invention.

Unlike conventional tillers, the assembly 10 according to the present invention, includes at least one—and preferably two—cylindrical drums 14 mounted on the shaft 18 for rotation therewith. Each cylindrical drum attachment according to the present invention includes a curved exterior surface 22 defined by a tubular shell 23, with a plurality of teeth 24, and means for mounting the teeth so that they project radially outwardly from the curved exterior surface 22 and are disposed in a plurality of spiral courses S. The mounting means may include permanent weldments or the like for fixing teeth 24 to the surface 22, or may comprise threaded openings in the surface 22 adapted to receive threaded male portions of the teeth 24. The disposition of the teeth in the spiral courses S insures that the assembly 10 will run smoothly in use, and will not bounce up and down. Although the spiral courses S may be disposed at a wide variety of angles and still accomplish the results according to the invention, one effective dimensioning (where the teeth 24 are half-inch in diameter and about one and one-half inches long) is a plan projection of the course S (as identified in FIG. 2) making an angle alpha ($\alpha$) with respect to the horizontal of about 30 degrees.

Additionally, the teeth 24 are preferably mounted in circumferential rows R (FIG. 2), all teeth in each circumferential row being disposed in a plane perpendicular to the shaft 18 as illustrated in the drawings. The teeth are preferably are cylindrical, with circular bases, a circular cylinder providing maximum effectiveness when assembly 10 is to be used for cultipacking. While a wide variety of dimensions and spacings may be provided, teeth 24 one-half inch in diameter, projecting one and one-half inches from the surface 22, and the center of each tooth 24 being spaced approximately two inches from the center of adjacent teeth in each spiral course S, has been found to be an effective arrangement, providing an assembly 10 that is capable of tilling, cultipacking, dethatching, preparation of seedbeds, working seed and fertilizer into the soil, and as a soil aereator. Also, it is possible to mount a plow point to the center bar 26 (FIG. 1) of the conventional tiller 12 so that the assembly 10 could be used for opening rows for planting in gardens also.

Figure 3:
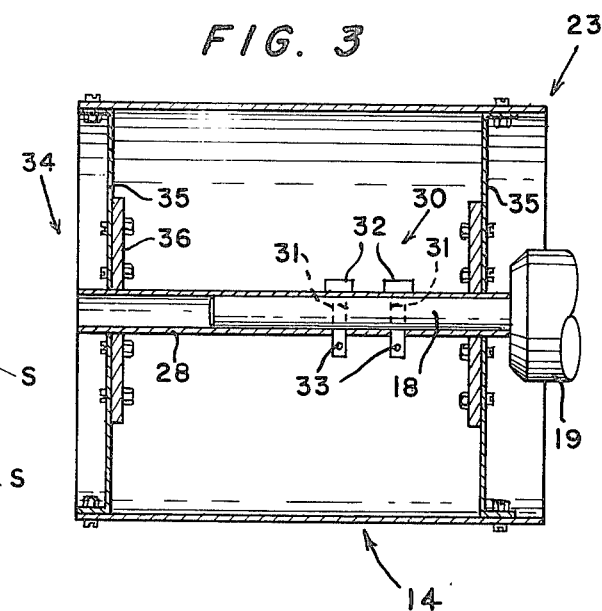
FIG. 3 is a view partly in section and partly in elevation showing the particulars of the attachment of the drum of FIG. 2 to a conventional tiller shaft.

The cylindrical drums 14 according to the invention also include an interior tubular sleeve 28 radially spaced from and concentric with the tubular shell 23, the sleeve 28 having an interior diameter substantially the same as the outside diameter of the shaft 18. The sleeve 28 is slipped over the shaft 18, as shown most clearly in FIG. 3, and detachable means 30 are provided for passing through the sleeve 28 and the shaft 18 for affixing the sleeve 28 to the shaft 18 for transferring rotation of the shaft 18 to rotation of the sleeve 28. The readily detachable means 30 may comprise a wide variety of components, however most conventional tillers 12 on the market today have one or two openings formed in their draft 18 for receipt of three-eighths inch pins 31 or the like for attachment of the conventional tiller blades to the shaft 18, and these same holes may be utilized. Each pin 31 includes a head 32 at one end thereof, in an opening at the other end thereof, the opening adapted to receive a spring keeper key 33.

Figure 4:
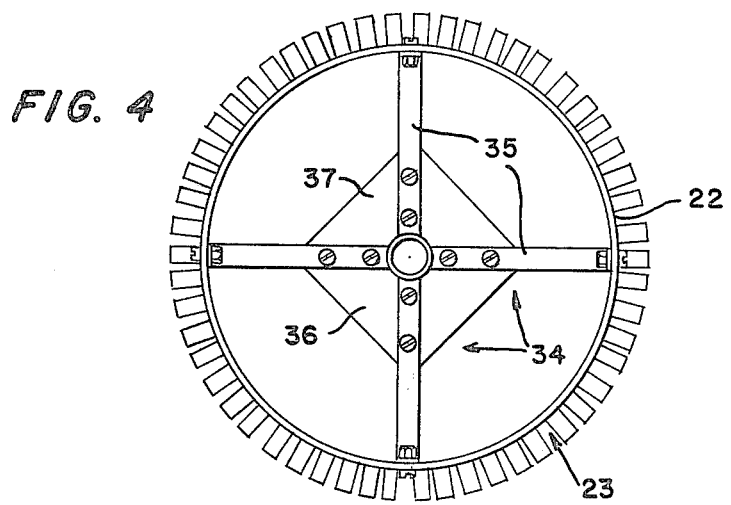
FIG. 4 is a side view of the drum of FIG. 3 attached to a shaft.

Means 34 are provided extending between the sleeve 28 and the tubular shell 23 for attaching the shell 23 to the sleeve 28 so that rotation of the sleeve 28 effects coincident rotation of the shell 23, while allowing access to the detachable means 30 from a point exterior of the drum. Such means 34 preferably comprise a pair of spider assemblies 35 (three or more radially extending members provided in each spider assembly 35), the spaces between the radially extending members of the spider assemblies 35 defining a sufficiently large opening so that an individual may place his hand or a tool between the shell 23 and a spider means 35 to attach or remove the means 30. To provide positive support for the spider means 35, preferably a reinforcing plate 36 is attached to each spider assembly 35. While the plate 36 may have a wide variety of sizes, at least one of the plates 36 must have one surface (i.e, 37—See FIG. 4) thereof radially spaced from the tubular shell 23 so that—as previously mentioned—an individual may place his hand or a tool between the shell 23 and the edge 37 to gain access to the detachable means 30.

The basic structure according to the present invention having been described, an exemplary mode of operation thereof will now be set forth. When it is desired to till, cultipack, aereate dethatch, or the like, an individual removes the conventional tiller blades from a conventional tiller 12, and attachs a pair of drums 14 to the shaft 18 of the tiller 12. The drums 14 are attached by sliding the sleeves 28 thereof over the shaft 18, and passing pins 31 through corresponding openings formed in the sleeve 28 and shaft 18, the pins 31 being retained in place by the heads 32 and spring keeper keys 33. The attaching means 34 allow ready access to the pins 31 in addition to transmitting rotation of the sleeve 28 to rotation of the tubular shell 23.

In use, an operator will grasp the handle means 15 of the assembly 10 in much the same manner as when the structure is operated to till with conventional tilling blades. For cultipacking, the operator will not supply any pushing force to the handle means 15, but rather the rotation of the drums 14 themselves, and engagement of the teeth 24 with the soil, will result in a slow forward movement of the assembly 10. For other uses, such as tilling, seedbed preparation, aeration, etc., the operator will normally apply a pushing force to the handle 15, or the wheels 20 may be self-propelled and apply the driving force. The assembly 10 may be used on a lawn for effective dethatching, the teeth 24 engaging dead and dried grasses and pulling them to the surface of the lawn, or it may be used for working seed or fertilizer that has been spread on the ground into the ground. For all of its uses, the assembly 10 is highly maneuverable compared to the conventional tiller 12 with conventional tiller blades.

When operation of the assembly 10 is completed, the drums 14 may be removed by merely reaching between the plate 36 and tubular shell 23 and removing the spring keeper 33 and the pins 31, and sliding the sleeve 28 off of the shaft 18. The drums 14 may then be cleaned, stored, or repaired.

It will thus be seen that according to the present invention an earth-working assembly has been provided that has a great deal of flexibility of function, and an attachment has been provided for a conventional tiller that—in a simple manner—greatly extends the capabilities of the tiller. While the invention has been here and shown and described in what is presently conceived the most practicable and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed:

1. An attachment for a tiller controlled by an operator walking behind the tiller and comprising a horizontally disposed shaft, power means for rotating the shaft, handle means for engagement by the operator, and wheels disposed between the shaft and handle means, for supporting the tiller, said attachment comprising a cylindrical drum having a tubular shell defining an exterior curved surface, and having a tubular sleeve disposed interiorly of and radially spaced from said tubular shell and concentric therewith, said sleeve having an interior surface adapted for engagement with the outside surface of said shaft;

detachable means for passing through said sleeve and said shaft for affixing said sleeve to said shaft for transferring rotation of said shaft to rotation of said sleeve, means extending between said sleeve and said tubular shell for attaching said sleeve to said shell so that rotation of said sleeve effects coincident rotation of said shell while allowing access to said detachable means from a point exterior of said drum, a plurality of substantially cylindrical teeth extending substantially linearly radially outwardly from the exterior curved surface of said drum, and means for mounting said teeth in circumferential rows, at least three teeth in each circumferential row, so that they project radially outwardly from the curved exterior surface and are disposed in a plurality of spiral courses, all teeth in each circumferential row being disposed in a plane perpendicular to said tubular sleeve with each of said cylindrical teeth having a diameter of about one-third the distance that it extends radially outwardly from the exterior surface of said drum and the center of each of said teeth being spaced approximately four times its diameter from the teeth adjacent thereto.

2. An assembly as recited in claim 1 wherein each of said teeth cylinders has a diameter of about one-half inch, and extends radially outwardly approximately one and one-half inches from the exterior surface of said drum.

3. An assembly as recited in claim 1 wherein the center of each of said teeth is spaced approximately 2 inches from the adjacent teeth in each spiral course.

4. An attachment as recited in claim 1 wherein said detachable means comprises at least one pin adapted to extend through corresponding openings in said sleeve and said shaft, said pin having a head at one end thereof and an opening at the other end thereof, and a spring keeper key adapted to extend through said opening at said other end of said pin.

5. An attachment as recited in claim 1 wherein said means extending between said sleeve and said shaft comprises a pair of spider assemblies spaced along the length of said sleeve.

6. An attachment as recited in claim 2 further comprising a reinforcing plate attached to each of said spider assemblies, at least one of said plates having one surface thereof radially spaced from said tubular shell.

* * * * *